(12) United States Patent
Vasquez

(10) Patent No.: US 10,114,144 B2
(45) Date of Patent: Oct. 30, 2018

(54) SCALE IDENTIFIER

(71) Applicant: Halliburton Energy Services, Inc., Houston, TX (US)

(72) Inventor: Quintilio Vasquez, Mohammadiyah Compound (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/317,033

(22) PCT Filed: Jul. 7, 2014

(86) PCT No.: PCT/US2014/045518
§ 371 (c)(1),
(2) Date: Dec. 7, 2016

(87) PCT Pub. No.: WO2016/007117
PCT Pub. Date: Jan. 14, 2016

(65) Prior Publication Data
US 2017/0108611 A1 Apr. 20, 2017

(51) Int. Cl.
*G01V 5/10* (2006.01)
*G01B 5/12* (2006.01)
*G01B 3/38* (2006.01)
*E21B 47/08* (2012.01)

(52) U.S. Cl.
CPC ............. *G01V 5/105* (2013.01); *E21B 47/08* (2013.01); *E21B 47/082* (2013.01); *G01B 3/38* (2013.01); *G01B 5/12* (2013.01)

(58) Field of Classification Search
CPC ...................................... E21B 47/08

USPC .......................................... 175/50
See application file for complete search history.

(56) References Cited

U.S. PATENT DOCUMENTS 4,914,826 A 4/1990 Nold, III
5,038,033 A 8/1991 Carroll et al.
5,072,388 A 12/1991 O'Sullivan et al.
(Continued)

FOREIGN PATENT DOCUMENTS

CA 2377123 9/2002

OTHER PUBLICATIONS

European Search Report for International Application No. PCT/US2014/045518 dated Sep. 6, 2017.
(Continued)

*Primary Examiner* — Kenneth J Malkowski
(74) *Attorney, Agent, or Firm* — Scott Richardson Tumey L.L.P.

(57) ABSTRACT

Scale identifier systems and methods for generating a log of scale type and location in subterranean formations, and, more particularly, in wellbore tubing are provided. A method for scale identification may be provided. The method may comprise providing a first logging tool comprising a tool body, a neutron source coupled to the tool body, and detectors coupled to the tool body; providing a second logging tool for measuring deviations in inner diameter of a tubing in a wellbore; placing the first logging tool and the second logging tool into the wellbore; logging the interior of the tubing with the first logging tool and the second logging tool to generate data; and generating a log of scale location and type from the data.

20 Claims, 7 Drawing Sheets

(56) References Cited

U.S. PATENT DOCUMENTS

| | | | |
|---|---|---|---|
| 6,880,402 B1* | 4/2005 | Couet | B08B 3/12 |
| | | | 73/1.49 |
| 6,886,406 B1 | 5/2005 | Couet et al. | |
| 2002/0070337 A1* | 6/2002 | Fitzgerald | G01V 5/04 |
| | | | 250/256 |
| 2003/0074139 A1 | 4/2003 | Poedjono | |
| 2011/0253364 A1 | 10/2011 | Mosse et al. | |
| 2012/0326017 A1* | 12/2012 | Nikitin | G01V 5/101 |
| | | | 250/269.7 |
| 2013/0087328 A1* | 4/2013 | Maida, Jr. | E21B 47/123 |
| | | | 166/250.05 |
| 2014/0177673 A1* | 6/2014 | Bliss | G01N 25/18 |
| | | | 374/165 |
| 2015/0315904 A1* | 11/2015 | Manclossi | E21B 47/08 |
| | | | 702/8 |
| 2015/0323697 A1* | 11/2015 | Ohmer | G01V 3/30 |
| | | | 324/333 |

OTHER PUBLICATIONS

"Figthing Scale-Removal and Prevention" by Oilfield Review, dated Jan. 1, 1999.
SPWLA 1998 paper K "A New Small-Diameter, High-Performance Reservoir Monitoring Tool" Jacobson et al. dated May 26, 1998.
SPWLA 2001 "Field Experience and Results Obtained With an Improved Carbon/Oxygen Logging System for Reservoir Optimization Information" Truax et al, dated Jun. 17, 2001.
International Search Report and Written Opinion for International Application No. PCT/US2014/045518 dated Mar. 20, 2015.

* cited by examiner

SCALE IDENTIFIER

BACKGROUND

Scale identifier systems and methods for generating a log of scale type and location in subterranean formations, and, more particularly, in wellbore tubing are provided.

Scale may be present in various types of wellbore tubing (e.g., casing, production tubing, etc.). Generally, the scale may comprise various types of minerals, for example, calcium carbonate ($CaCO_3$), calcium sulfate ($CaSO_4$), barium sulfate ($BaSO_4$), iron scales ($FeS_2$), and the like. During the lifecycle of a well, scale may build up in the wellbore tubing due to the precipitation of ions from the water that was run through the tubing. Over time, this buildup may reduce or cause a complete loss of production in the well. Until the scale is properly treated, this loss of production may continue, ultimately affecting the economic viability of the well.

Currently, there is no practical way to identify the scale without taking and analyzing samples. This can however lead to several problems. For example, it may not be possible to isolate samples at every section of the tubing. Therefore, there may be gaps in the analysis with regards to some locations and consequently the types of scale at those locations. Moreover, the scale samples may frequently be of a crystalline nature, which may pulverize when removed or transported. If the samples pulverize, analysis may be more difficult or even impossible. Thus, in some instances, sample analysis in this manner may not be possible due to the nature and location of the scale. If the scale cannot be identified, treatment fluids applied to treat the scale may be done so indiscriminately. As such, if the wrong treatment fluid is used, the scale may not be removed and further treatments may be required until an effective treatment fluid is found. Thus, determining which treatment fluid may be effective is a process that can be wasteful. This trial and error approach may significantly increase downtime, cost, and the operational efficiency of the well.

BRIEF DESCRIPTION OF THE DRAWINGS

These drawings illustrate certain aspects of some of the embodiments of the present invention, and should not be used to limit or define the invention.

DETAILED DESCRIPTION

Scale identifier systems and methods for generating a log of scale type and location in subterranean formations, and, more particularly, in wellbore tubing are provided. The scale identifier systems may comprise a first logging tool for measuring scale elemental makeup and a second logging tool for measuring deviations in the inner diameter of the wellbore tubing. The methods of generating a log of scale type and location includes identifying the type and location of scale in any type of wellbore tubing. The term "scale" as used herein refers to a mineral buildup, for example, the mineral buildup may comprise $CaCO_3$, $CaSO_4$, $BaSO_4$, $FeS_2$, brines, or other minerals that may be encountered in the water used in or produced from oil and gas operations. One of the many potential advantages of the systems and methods described herein is that the elemental makeup of the scale may be identified without needing to extract and analyze samples of the scale. An additional advantage is that the elemental makeup of the scale may be distinguished from the elemental makeup of the surrounding wellbore and/or the subterranean formation. A further advantage is that after the identification of the scale, the scale may be treated with a treatment that is specifically targeted to the specific type of scale, thereby reducing the guesswork normally involved with scale treatment and consequently reducing the expense and downtime of these well operations.

Figure 1:
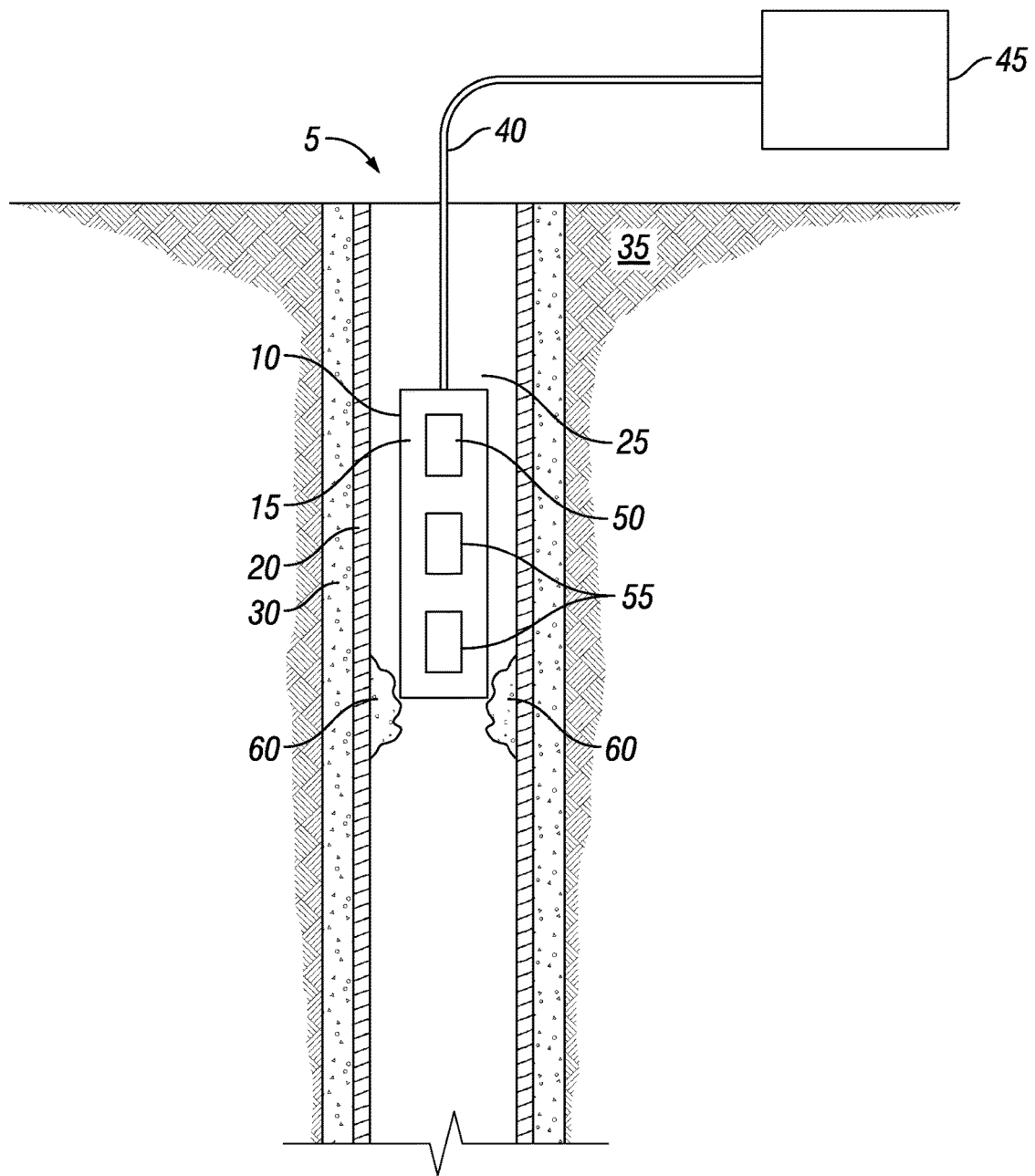
FIG. 1 is a schematic illustration of an example system that may be used for logging of the elemental makeup of a portion of a subterranean formation, wellbore, and wellbore equipment.

FIG. 1 illustrates first logging system 5 which may be used in accordance with an embodiment. First logging system 5 may comprise first logging tool 10. First logging tool 10 may comprise a tool body 15, which may be placed within tubing 20 of wellbore 25. Tubing 20 may comprise any type of wellbore tubing including, without limitation, casing, production tubing, etc. Tubing 20 may have cement 30 disposed between its outer diameter and subterranean formation 35.

Tool body 15 may be suspended within tubing 20 by conveyance string 40. Tool body 15 may be raised and lowered within wellbore 25 by way of conveyance string 40 such that first logging tool 10 may be run through at least a portion of the interior of tubing 20. Conveyance string 40 may comprise, without limitation, a wireline cable, a slickline cable, coiled tubing, etc. Conveyance string 40 may provide support for tool body 15 and may also couple first logging tool 10 to computer system 45. Alternatively, computer system 45 may be in wireless communication with first logging tool 10. As illustrated, computer system 45 may be located at the surface of wellbore 25. Alternatively, computer system 45 may be located downhole, for example, computer system 45 may be coupled to, or otherwise disposed on, first logging tool 10. Computer system 45 may analyze the logging data generated by first logging tool 10 to a produce a log of all (or a portion of) the measurements taken by first logging tool 10 within tubing 20.

First logging tool 10 may be used to measure the elemental makeup of scale 60. First logging tool 10 may comprise, but is not limited to, a pulsed neutron logging tool. First logging tool 10 may be used in conjunction with data analysis software. An example method used by first logging tool 10 for determining the elemental makeup of scale 60 may include, neutron induced gamma ray spectroscopy. A commercial example of a suitable first logging tool 10 is the RMT Elite™ Reservoir Monitor Tool available from Halliburton Energy Services, Inc., Houston, Tex. Another commercial example of a suitable first logging tool 10 is the TMD3D™ logging tool available from Halliburton Energy Services, Inc., Houston, Tex.

First logging tool 10 may comprise a neutron source 50 and detectors 55. As illustrated, neutron source 50 may be coupled to tool body 15. For example, neutron source 50 may be mounted to and/or disposed within or around tool body 15. Neutron source 50 may emit neutrons. For example, neutron source 50 may be capable of emitting neutrons in a pulsed fashion, possibly on command from computer system 45. Alternatively, neutron source 50 may produce neutrons in a continuous fashion. Any neutron source 50 emitting neutrons with sufficient energy and having a requisite size such as to allow it movement within the tubing 20 may be used. The emitted neutrons interact with atoms of any nearby structures, which may include the tubing 20, wellbore 25, cement 30, subterranean formation 35, etc. to emit gamma rays having varying energies. Most importantly, if scale is present in the tubing 20, as illustrated by scale 60, the neutrons should interact with the atoms of the scale 60. While only one neutron source 50 is depicted on FIG. 1, first logging tool 10 may optionally comprise additional neutron sources as desired for a particular application.

As illustrated, detectors 55 may be coupled to tool body 15. For example, detectors 55 may be mounted to and/or disposed within or around tool body 15. Detectors 55 may be placed in any orientation. For example, as illustrated, detectors 55 may be relatively close to the neutron source 50, or may be spaced away from the neutron source 50. If the neutron source 50 is disposed about the exterior of the tool body 15, the neutron source 50 may be below, above, or in-between any grouping of the detectors 55. While FIG. 1 illustrates a pair of detectors 55 it should be understand that more or less detectors 55 may be used as desired for a particular application. Neutron source 50 may emit neutrons which, due to atomic collisions or capture by atoms, induce the emission of gamma rays which may be registered by detectors 55. Suitable detectors 55 should be capable of registering a gamma ray and its energy. Examples of suitable detectors 55 comprise, without limitation, scintillators. Detectors 55 may detect gamma rays created from collisions of neutrons with atomic nuclei (i.e. inelastic gamma rays) or gamma rays created when a neutron is captured by a nearby atom such that the neutron loses energy (i.e. capture gamma rays). Through analysis of the gamma ray spectra measured by detectors 55, the emission peaks of both the inelastic and capture gamma rays can be charted as a function of energy (e.g., MeV). These emission peaks may then compared to base pure element spectra to determine the elemental makeup of the measured area surrounding first logging tool 10. Typically, the elements that may be measured in this manner include, without limitation, hydrogen, carbon, oxygen, magnesium, aluminum, silicon, sulfur, chlorine, potassium, calcium, iron, titanium, manganese, and gadolinium. As will be discussed in more detail below, this data describing the elemental make-up of the measured area surrounding first logging tool 10 may be used in combination with other data (e.g., data regarding deviations in inner diameter of tubing 20) to determine the location and type of scale 60 in tubing 20.

Without being limited by theory, computer system 45 may analyze the spectra of the capture gamma rays (i.e., those gamma rays released when a neutron is captured by an atom) and after correction by subtracting the natural and activation background, computer system 45 may reduce the corrected capture spectrum to a log that illustrates the normalized counts of the detectors with the measured energy as fit to the base pure element spectra. The transmission of the data, analysis of the data, as well as the display of the results may all or individually occur in real-time. From this analysis, the elemental yield of every area in tubing 20 and the surrounding structures through which first logging tool 10 was run, may be categorized and presented as a function of depth. This analysis is possible because the capture gamma ray data may be recorded as first logging tool 10 is lowered through tubing 20, and since the depth of first logging tool 10 may be tracked within tubing 20, the data may be analyzed relative to the depth of first logging tool 10 where the capture gamma rays were registered, thus allowing the creation of an elemental spectra log as a function of tubing 20 depth. This method may allow one of ordinary skill in the art to determine the elemental yield of certain elements, e.g., H, C, O, Ca, Si, Fe, Cl, K, S, and Ti, at a specific depth, and more importantly, when the elemental yield increases at one depth relative to another depth, as may be the case when first logging tool 10 is run through at least a portion of tubing 20.

Figure 2:
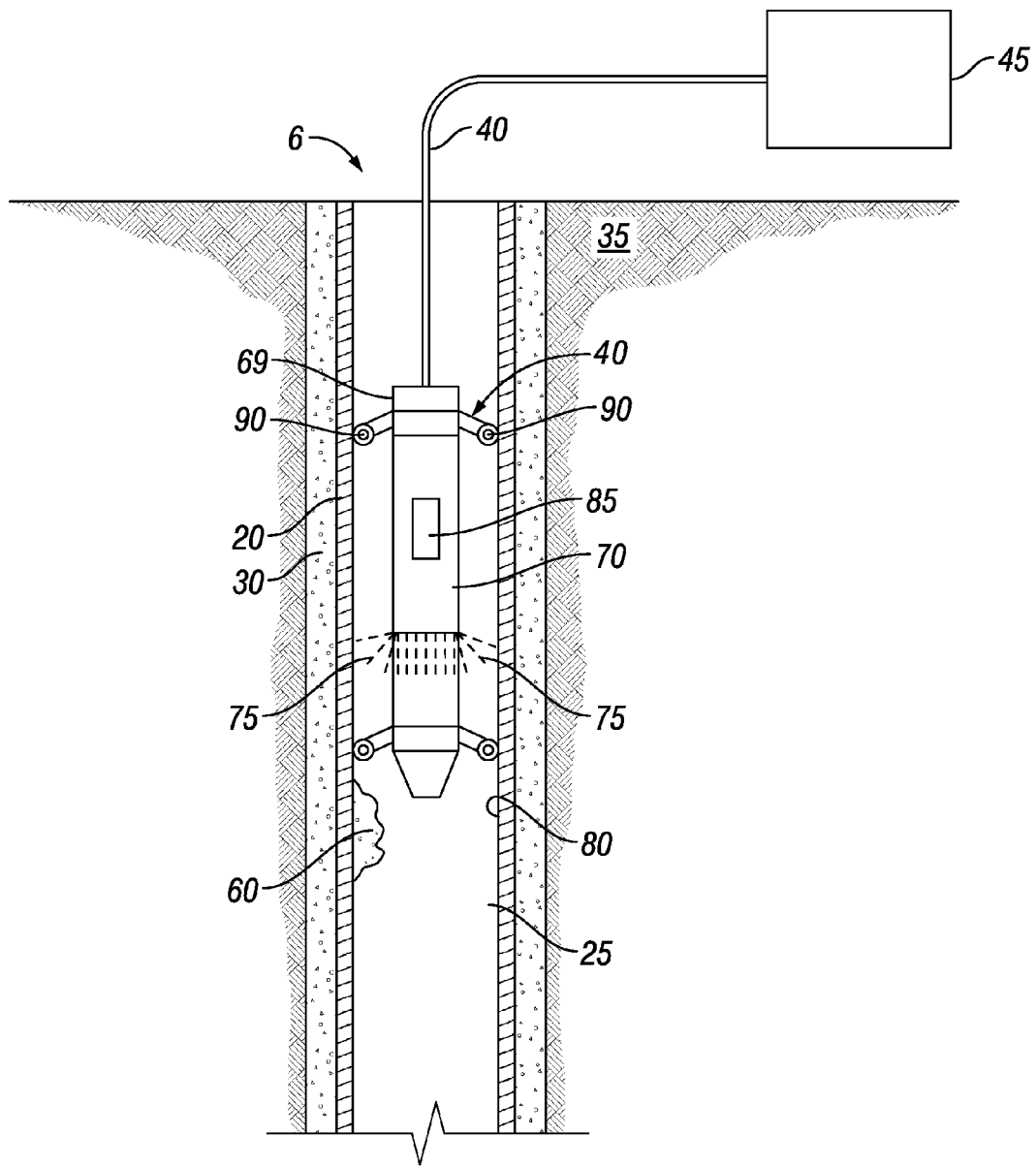
FIG. 2 is a schematic illustration of an example system that may be used for logging of the location of a deviation in the inner diameter of wellbore tubing.

FIG. 2 illustrates second logging system 6 which may be used in accordance with an embodiment. Second logging system 6 may comprise a second logging tool (illustrated on FIG. 2 as caliper tool 65) for measuring deviations in the inner diameter of tubing 20. Caliper tool 65 may comprise caliper tool body 70 that may be placed within tubing 20 of wellbore 25. Tubing 20 may comprise any type of wellbore tubing including casing, production tubing, etc. Tubing 20 may have cement 30 disposed between its outer diameter and subterranean formation 35. Caliper tool body 70 may be suspended within tubing 20 by conveyance string 40. Conveyance string 40 may comprise, without limitation, a wireline cable, a slickline cable, coiled tubing, etc. Conveyance string 40 may provide support for the caliper tool body 70 and also may couple caliper tool 65 to computer system 45. Alternatively, caliper tool 65 may be wirelessly coupled to computer system 45. Caliper tool body 70 may be raised and lowered within the wellbore 25 by way of the conveyance string 40. As illustrated, computer system 45 may be located at the surface of wellbore 25. Alternatively, computer system 45 may be located downhole, for example, computer system 45 may be coupled to, or otherwise disposed on, caliper tool 65. Computer system 45 may analyze the logging data generated by caliper tool 65 to produce a log of all (or a portion of) the measurements taken by caliper tool 65 within tubing 20.

Caliper tool 65 may be used to measure any deviations in the inner diameter of tubing 20. Generally, caliper tool 65 may be capable of detecting deviations in the inner diameter of tubing 20 and measuring the relative size of the deviations. Additionally, caliper tool 65 may transmit the measurements of the inner diameter to computer system 45 or other data recording/processing apparatus. Examples of suitable caliper tools 65 may include, but are not limited to, caliper tools 65 comprising multiple caliper arms (e.g., caliper arms 75), motorized caliper tools, etc. A commercial example of a caliper tool is the Multi-Sensor Caliper (MSC™) Tool available from Weatherford International, Geneva, Switzerland. Other logging tools that may be capable of measuring deviations in the inner diameter of tubing 20 may also be used as the second logging tool in conjunction with or in place of caliper tool 65. Examples of additional logging tools that may be used in the measurement of deviations in the inner diameter of the tubing 20 include, without limitation, electromagnetic logging tools and acoustic logging tools. In general, electromagnetic logging tools may induce alternating electromagnetic fields into surrounding area and measure various phenomena which occur as a result of interaction of the alternating electromagnetic fields with the surrounding area, including tubing 20, scale 60, and subterranean formation 35, surrounding the logging tool. From these electromagnetic measurements, deviations in the inner diameter of tubing 20 may be determined. An example of an acoustic logging tool is the Xaminer™ Electromagnetic Corrosion Tool available from Halliburton Energy Services, Inc., Houston, Tex. Acoustic logging tools may include an acoustic source that emits an acoustic signal that may be recorded by acoustic receivers that may also be disposed on the logging tool. From these acoustic measurements, deviations in the inner diameter of tubing 20 may be determined. An example of an acoustic logging tool is the CAST-V™ Scanning Tool available from Halliburton Energy Services, Inc., Houston, Tex.

As illustrated, caliper tool 65 may comprise at least two caliper arms 75. Caliper arms 75 may be disposed about the exterior of caliper tool body 70 and extend outward from caliper tool body 70. Caliper arms 75 may be able to move independently from each other. Caliper arms 75 may contact interior wall 80 of tubing 20 to measure the interior of tubing 20 for deviations (e.g., scale 60). Caliper tool 65 may further comprise a motor 85 and controllers 90. Motor 85 may propel caliper tool 65 up or down conveyance string 40. Controllers 90 may maintain the caliper tool 65 in a generally central position within tubing 20 as caliper tool 65 is run up or down the conveyance string 40.

Caliper tool 65 may be attached to conveyance string 40 at the surface of wellbore 25. Conveyance string 40 may be run through tubing 20 present in wellbore 25. Caliper tool 65 may then be placed into tubing 20 and propelled down tubing 20 via motor 85. Alternatively, caliper tool 65 may be lowered to the bottom of tubing 20 via conveyance string 40 and then propelled upwards via motor 85 performing the same process along the way. As caliper tool 65 moves through tubing 20, caliper arms 75 may be in constant or near constant contact with interior wall 80 of tubing 20. Caliper tool 65 may maintain a roughly central position in tubing 20 using controllers 90, for example, to stabilize caliper tool 65 within tubing 20. As caliper arms 75 contact any scale 60 in tubing 20, caliper arms 75 adjust due to the contact with scale 60.

The adjustment of the caliper arms 75 in tubing 20 may be measured and may be used to create a log of the presence and magnitude of the deviations in the inner diameter of tubing 20 as a function of depth. For example, this adjustment may be conveyed to computer system 45. The conveyance may be via conveyance string 40, by wireless communication, or by another cable, wireline, etc. Computer system 45 may measure the adjustment and convey the information in real-time to an operator. Computer system 45 may analyze the adjustments of the caliper arms 75 and if they fall within a certain value range, which may be selected by the operator based on a variety of factors, such as tubing changes/transitions in the wellbore, computer system 45 may generate a log which indicates that scale 60 may be present in wellbore 25 at a specific location in the wellbore 25. As will be discussed in more detail below, this log and/or measurement of caliper tool 65 may be used in conjunction with data from another logging tool (e.g., first logging tool 10 on FIG. 1) to determine the location and type of scale 60 within tubing 20. With this information concerning the location and type of scale 60, an appropriate scale treatment may be selected and applied in tubing 20.

Figure 3:
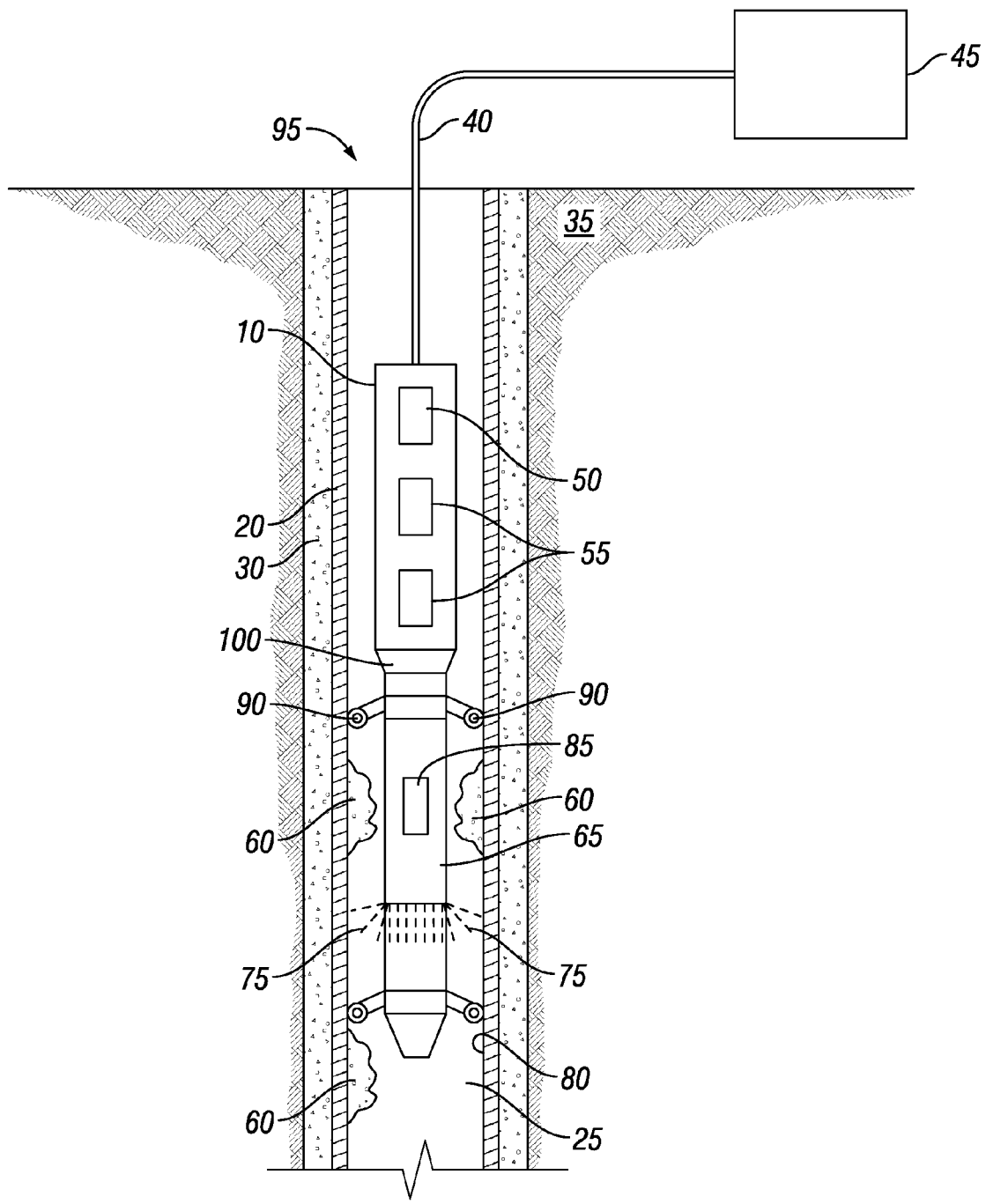
FIG. 3 is a schematic illustration of an example system that may be used for logging of the type and location of scale present in the interior of wellbore tubing.

Referring now to FIG. 3, scale identifier system 95 is illustrated. Scale identifier system 95 may comprise connected unit 100 which may comprise first logging tool 10 and caliper tool 65 that are connected to form a single unit connected to conveyance string 40. The first logging tool 10 and caliper tool 65 may be connected in any configuration and in any order to form connected unit 100. In alternative embodiments, first logging tool 10 and caliper tool 65 may be kept separate, and run one on top of the other on conveyance string 40 (or on separate strings) in either close proximity to each other or at a distance from each other. In another alternative embodiment, first logging tool 10 and caliper tool 65 may be run on conveyance string 40 (or on separate strings) at separate times entirely, in any order. However, it is preferred, though not necessary, that first logging tool 10 and caliper tool 65 be run at the same time so as to minimize well downtime while logging. The data generated by the two may be analyzed together to generate a single real-time log that identifies the location and type of scale. If first logging tool 10 and caliper tool 65 are run at separate times altogether, the data of the latter tool may be synced with the earlier recorded data of the former using wellbore depth as the linking measurement in order to generate a log of the location and type of scale. The resulting log may be presented in real-time or as a post-processed log once the measurements of the latter tool are synced with and compared to the earlier recorded measurements of the former tool. Referring back to FIG. 3, the connected unit 100 may be run into tubing 20 in wellbore 25 along conveyance string 40 in a similar fashion to that described above with respect to either first logging tool 10 and/or caliper tool 65.

As illustrated, connected unit may comprise caliper tool 65. Caliper tool 65 may comprise caliper arms 75 which may contact interior wall 80 of tubing 20. As caliper tool 65 contacts scale 60 within tubing 20, caliper arms 75 may adjusted in an analogous fashion to that previously described with respect to FIG. 2. Connected unit 100 may further comprise first logging tool 10 comprising neutron source 50 and detectors 55, which may analogous to neutron source and detectors 55 of described with respect to FIG. 1. Neutron source 50 may emit neutrons. The neutrons may interact with atoms of any of the structures nearby which may include the tubing 20, wellbore 25, cement 30, formation 35, etc. to produce gamma rays having varying energies. More importantly, if scale is present in tubing 20, as illustrated by scale 60, the neutrons should interact with the atoms of scale 60. Detectors 55 may detect the presence and energy of gamma rays. The measurements for the adjustments of caliper arms 75 and the spectra of the captured gamma rays from detectors 55 may conveyed to computer system 45. The conveyance of this data may in real-time to computer system 45 and may also be by a wired (or wireless) connection. The presence of scale 60 may be confirmed by the adjustment of caliper arms 75 and the spectra of the captured gamma rays from detectors 55 may be analyzed to identify the elemental makeup of that specific location of scale 60.

Without being limited by theory, generally, computer system 45 may identify the type of scale 60 by confirming the presence of certain elements identified using first logging tool 10. For example, if the calcium yield is increased above the nominal value, the amount of sulfur may then be checked to see if the amount of sulfur increased above the nominal value. If the amount of sulfur increased above the nominal value, the scale 60 may be confirmed as calcium sulfate ($CaSO_4$), if the amount of sulfur does not increase above the nominal value, the scale 60 may be confirmed as calcium carbonate ($CaCO_3$). If the amount of iron and sulfur both increase above the nominal value then the scale 60 may be confirmed as iron scale ($FeS_2$). If the amount of barium and sulfur both increase than the scale 60 may be confirmed as barium sulfate ($BaSO_4$). If the amount of iron or barium increases without a corresponding increase in sulfur, no type of scale 60 may be confirmed. In this manner, the type and location of scale 60 within tubing 20 may be identified. Therefore, a treatment fluid that is specific to the treatment of the identified type of scale 60, may be used at the location of scale 60 in tubing 20. The nominal value of an element may be described as the value of a specific element when the second logging tool (e.g., caliper tool 65) has not detected a deviation in the inner diameter of tubing 20. Typically, this value is less than the presence of the element in scale 60, if the element is present in scale 60.

Figure 4:
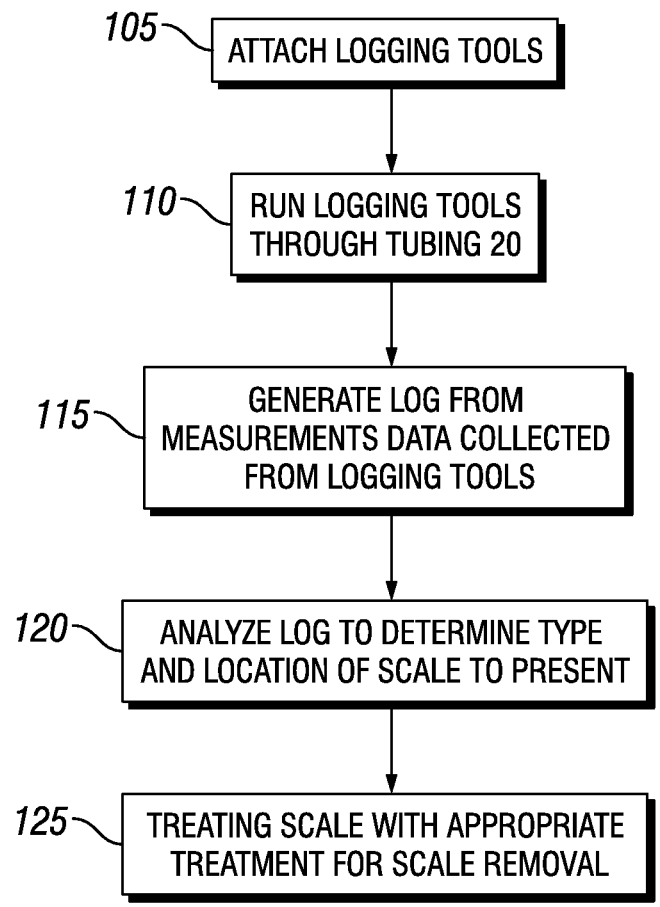
FIG. 4 is a block diagram illustrating an example technique for the identification of the type and location of scale in the interior of wellbore tubing and the subsequent treatment of the scale.

FIG. 4 is a block diagram illustrating an example method of scale identification. The method may be used in conjunction with one or more of the systems shown on FIGS. 1-3. At block 105, the method may include attaching logging tools conveyance string 40. For example, first logging tool 10 and second logging tool (e.g., caliper tool 65) may be attached to conveyance string 40 either as connected unit 100 or separately. At block 110, the method may include running the logging tools through at least a portion of tubing 20. For example, first logging tool 10 and caliper tool 65 may be placed at the top of tubing 20 so as to be run to the bottom of tubing 20 or first logging tool 10, and caliper tool 65 may be lowered to the bottom of tubing 20 so as to be run to the top of tubing 20. At block 115, once the logging tools may be placed at the starting location for to begin their logging of tubing 20, the method may include generating a log (or logs) from the measurement data collected from the logging tools. The log(s) may be generated in real-time. At block 120, the method may further include analyzing the log (or logs) to determine the type and location of scale 60 present in tubing 20 such that an appropriate scale treatment may be identified. At block 125, the method may include treating scale with appropriate treatment for scale removal.

Figure 5:
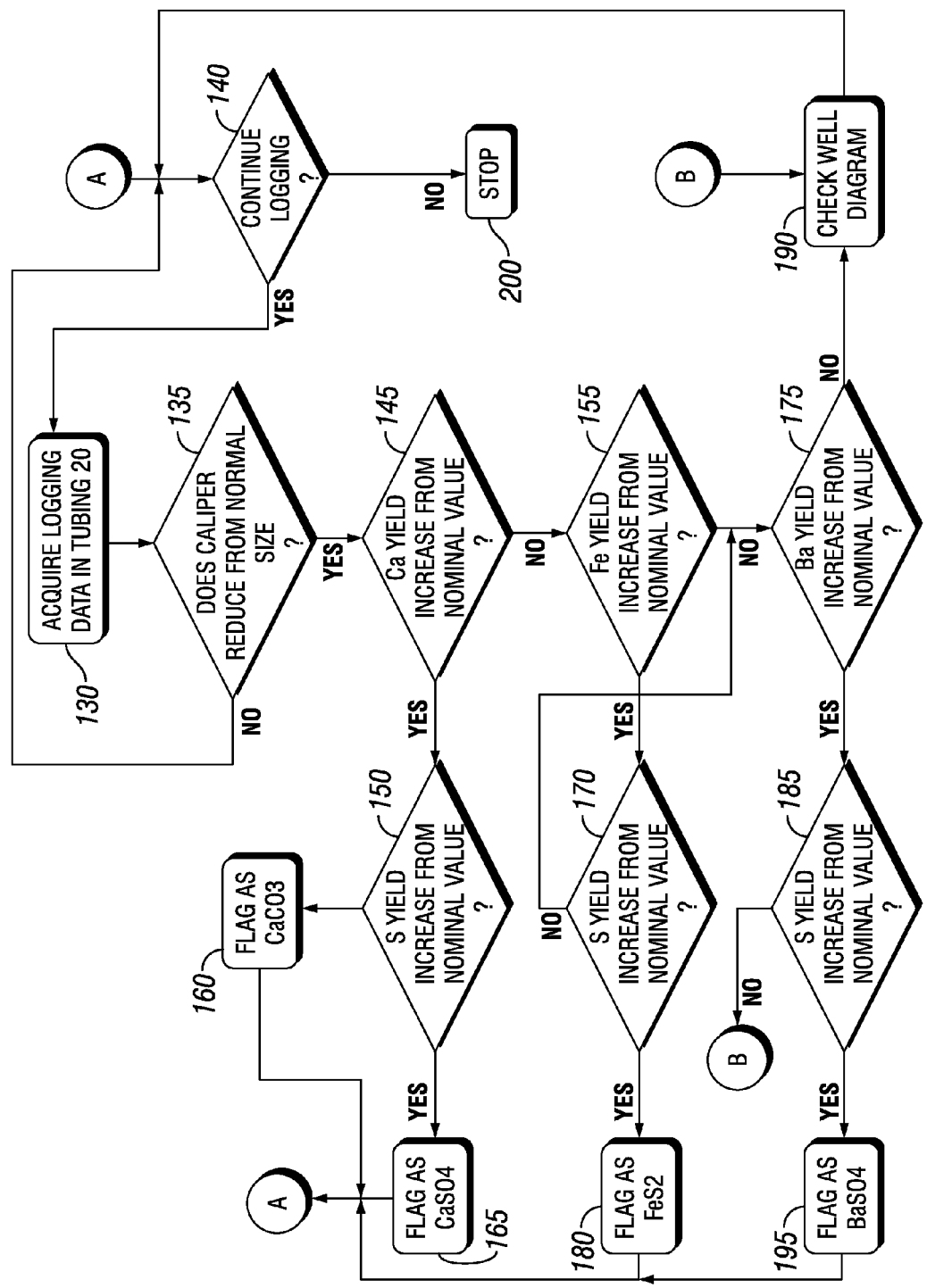
FIG. 5 is a block diagram illustrating an example technique for the identification of the type and location of scale in the interior wellbore tubing.

FIG. 5 is a block diagram illustrating an example method for generation of a log for the identification of the type and location of scale 60. The method may be used in conjunction with one or more of the systems shown on FIGS. 1-3. The method may be performed in real-time. At block 130, the method may include acquiring logging data in tubing 20. The logging data may be acquired via first logging tool 10 and second logging tool (e.g., caliper tool 65) together as connected unit 100 or separately. At block 135, it may be determined whether the second logging tool has identified a deviation in the internal diameter of the tubing 20, for example, whether caliper arms 75 of the caliper tool 65 undergo an adjustment. A deviation in the internal diameter of tubing 20 may indicate the possibility of scale 60 at a specific point in wellbore 25 (see, e.g., FIGS. 1-3), for example, due to a deviation in the internal diameter of tubing 20 from scale 60 which causes caliper arms 75 to adjust as they contact scale 60. If there is no deviation in the internal diameter, the method continues to block 140. At block 140, a determination may be made whether to continue logging. Logging may be continued, for example, until first logging tool 10 and second logging tool (e.g., caliper tool 65), either together as connected unit 100 or separately, reach a designated endpoint in the tubing 20. If logging is not continued, logging may be stopped as depicted by block 200. If logging is to continue, the method may return to block 130 to acquire additional logging data in tubing 20.

Returning now to block 135, if there is a deviation in the internal diameter of tubing 20 identified, data generated by first logging tool 10 may be analyzed beginning with block 145, which may determine whether the calcium yield increases above the nominal value. If yes, proceed to block 150, if no proceed to block 155. At block 150, it may be determined whether the sulfur yield increases above the nominal value. If no, scale 60 may be flagged as $CaCO_3$ as depicted by block 160. If yes, scale 60 may be flagged as $CaSO_4$ as depicted by block 165. After identifying scale 60 in ether block 160 or 165, the method may return to block 140 to determine whether to continue logging.

Returning now to block 145, if the calcium yield did not increase above the nominal value, the method may move to block 155 as described above, which may determine whether the iron yield increases above the nominal value. If the iron yield increases above the nominal value, the method may proceed to block 170. If the iron yield does not increase above the nominal value the method may proceed to block 175. At block 170, the sulfur yield may be determined. If the sulfur yield increases above its nominal value, scale 60 may be flagged as $FeS_2$ as depicted by block 180. After identifying scale 60 in block 180, the method may return to block 140 to determine whether to continue logging.

If it is determined at block 170 that the sulfur yield did not increase above its nominal value, the method may move to block 175, which, as stated above, is also the result if the iron value did not increase above its nominal value at block 155. At block 175, the barium yield may be determined. If the barium yield is increased above its nominal value, the method may move to block 185. If the barium yield does not increase above its nominal value, the method may move to block 190, which is for the operator to check the well diagram to determine, for example, if the adjustment of caliper arms 75 registered by caliper tool 65 may due to a known alteration in tubing 20 or a known transition in tubing 20 and is thus not due to scale 60. At block 185, the sulfur yield may be determined. If the sulfur yield is increased above its nominal value, scale 60 may be flagged as $BaSO_4$ as depicted by block 195. After identifying scale 60 in block 195 or checking the well diagram in block 190, the method may return to block 140 to determine whether to continue logging.

If it is determined at block 185 that the sulfur yield does not increase above its nominal value, the method may move to block 190, which, as stated above, is for the operator to check the well diagram to determine, for example, if the deviation in the internal diameter registered by the second logging tool may be due to a known alteration in tubing 20 or a known transition in the tubing 20 and thus not due to scale 60. After checking the well diagram in block 190, the method may return to block 140 to determine whether to continue logging. Although FIG. 5 describes the process of the identification of scale 60 proceeding in a specific order with regards to the analysis of the elemental makeup of scale 60, the elemental analysis steps, specifically blocks 145, 155, and 175, may be performed in any order. Thus, once the caliper has reduced from its nominal size in block 135, any of the steps in blocks 145, 155, or 175 may be performed. For example, it is not necessary to look at the value of calcium before barium.

Figure 6:
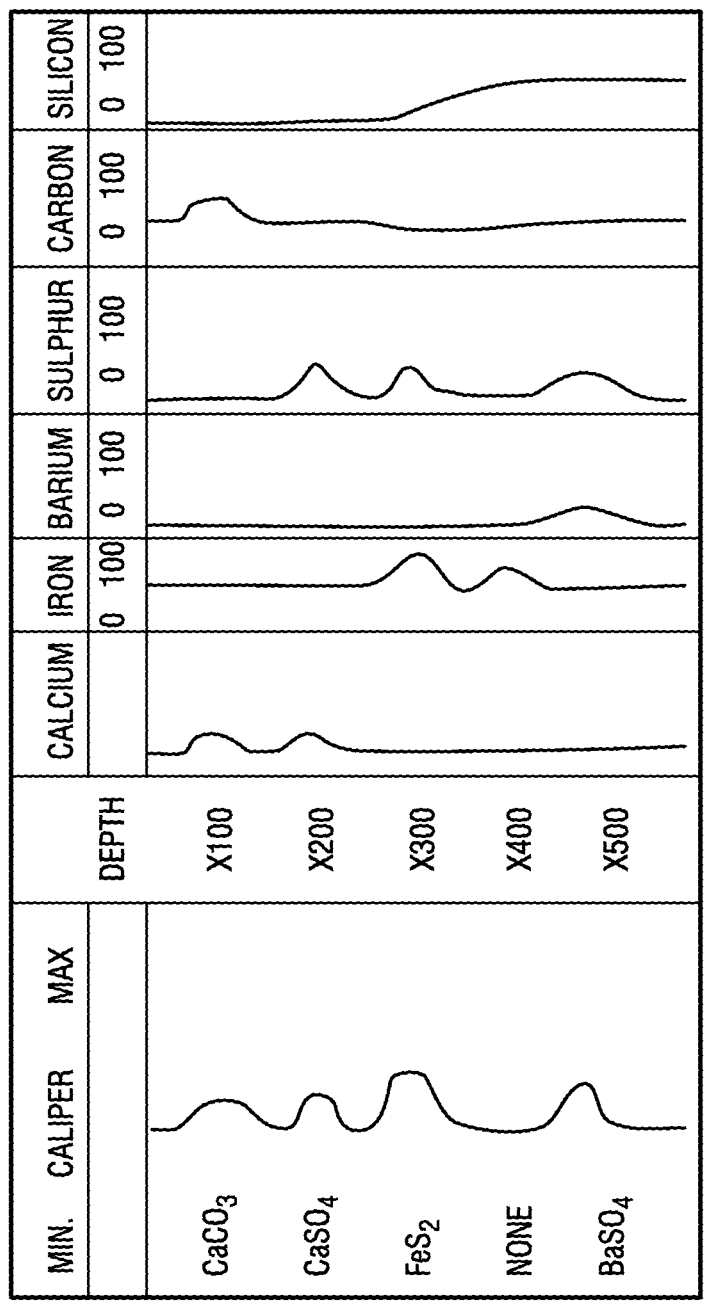
FIG. 6 is a graphical representation of a simulated log displaying the presence and elemental makeup of scale as a function of depth in wellbore tubing.

FIG. 6 shows an example of a simulated log displaying the presence and elemental makeup of scale 60 as a function of depth. The log may be created by processing of data obtained from logging tools (e.g., first logging tool 10 and caliper tool 65), as described above with respect to FIGS. 1-5. The log may be generated by computer system 45. The data may be conveyed from first logging tool 10 and caliper tool 65 in real-time, may be analyzed in real-time, and the log may be generated from the data in real-time. Conversely, any of the events may occur at a later time. The log may be the product of a scale identifier system 95 illustrated on FIG. 3. The log may convey to one having ordinary skill in the art the location of and the type of scale 60 present in tubing 20 so that scale 60 may be treated with a targeted treatment. On the left side of FIG. 6, the caliper registers deviations (i.e., scale 60) as a function of depth. At each deviation, the elemental spectra may be viewed. At the first deviation, which is at a depth of ×100, calcium is detected above its nominal value and sulfur is not detected above its nominal value. The deviation at ×100 is thus flagged as $CaCO_3$, as indicated next to the caliper deviation detected at depth ×100. The process repeats at depth ×200 where another deviation is detected. At this deviation, calcium is again detected above its nominal value; however, sulfur is also detected above its nominal value. Thus, the deviation, or scale 60, detected at depth ×200 is flagged as $CaSO_4$, as indicated next to the caliper deviation detected at depth ×200. This process may be repeated for the entirety of the length of tubing 20 or for any portion of tubing 20 as desired.

Figure 7:
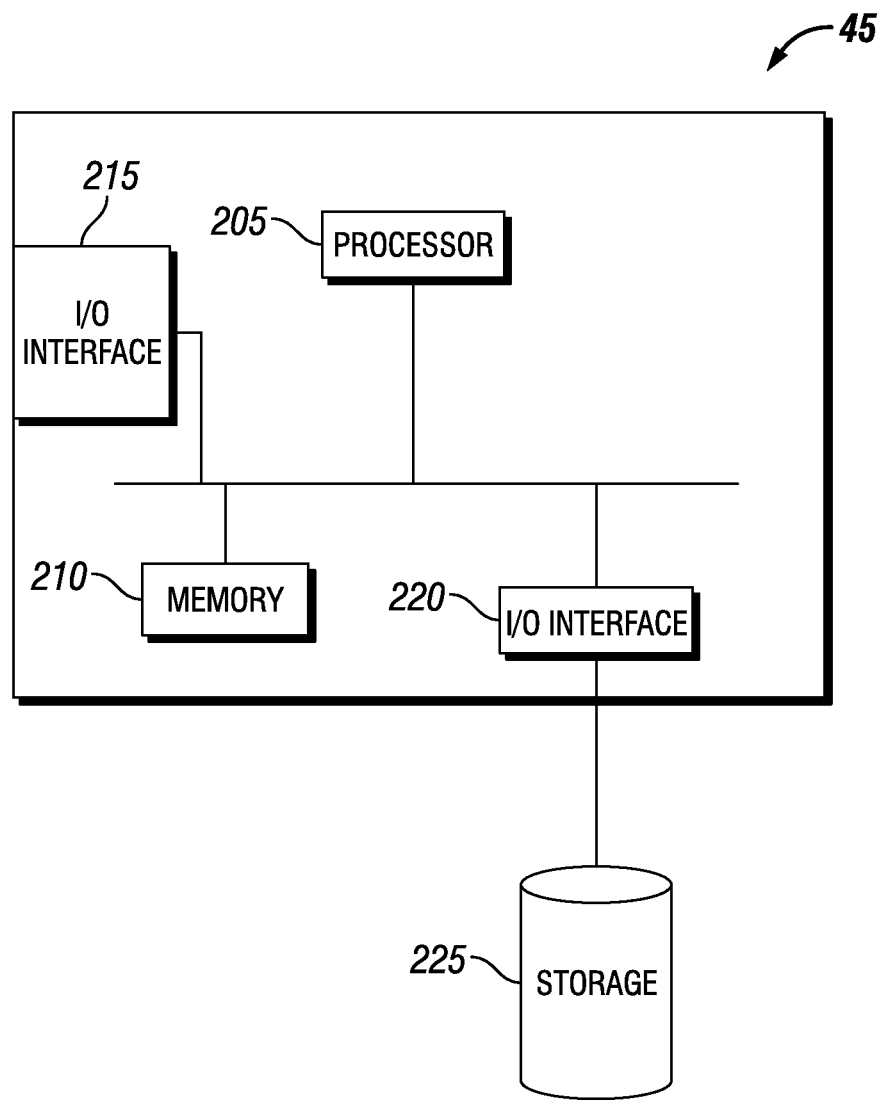
FIG. 7 is a block diagram of a computer system that may be used in implementation of the example techniques of scale identification.

FIG. 7 is a block diagram of an example computer system 45 that may be used in implementation of the example techniques of scale identification. Special or unique software for identifying the type and location of scale 60 (see, e.g., FIGS. 1-3) may be stored in computer system 45 and/or on external computer readable media. Those of ordinary skill in the art will appreciate that the computer system 45 may comprise hardware elements including circuitry, software elements including computer code stored on a machine-readable medium or a combination of both hardware and software elements. Additionally, the blocks shown are but one example of blocks that may be implemented.

As illustrated, computer system 45 may comprise processor 205, memory 210, a first input out ("I/O") interface 215, and a second I/O interface 220. Processor 205 may comprise one central processing unit or may be distributed across one or more processors in one or more locations. The processor 205 may acquire data from other components, such as first logging tool 10 (see, e.g., FIGS. 1 and 3) and caliper tool 65 (see, e.g., FIGS. 2 and 3). Memory 210 may be communicatively coupled to processor 205. Processor 205 may receive program instructions from memory 210. For example, the program instructions may configure processor 205 to process received data to generate a log of scale location and type. Memory 210 may be read-only memory, random-access memory, or the like. First I/O interface 215 and second I/O interface 220 may be communicatively coupled to processor 205. First I/O interfaces 215 and second I/O interface 220 may be any suitable system for connecting computer system 45 to a communication link, such as a direct connection, a private network, a virtual private network, a local area network, a wide area network ("WAN"), a wireless communication system, or combinations thereof; storage devices, such as storage 225; external devices, such as a keyboard, a monitor, a printer, a voice recognition device, or a mouse; or any other suitable system. Storage 225 also may be provided. Storage 225 may be communicatively coupled to second I/O interface 225. Storage 225 may comprise any device suitable for storing data to be processed, including, but not limited to, compact disc drives, floppy drives, hard disks, and the like. Those of ordinary skill in the art will appreciate that a suitable computer systems may comprise additional, fewer, and/or different components than those described for computer system 45.

A method for scale identification may be provided. The method may be used in conjunction with one or more of the systems illustrated on FIGS. 1-3. The method may include providing first logging tool 10 comprising tool body 15, neutron source 50 coupled to tool body 15, and detectors 55 coupled to tool body 15. First logging tool 10 may comprise a pulsed neutron logging tool. Detectors 15 may comprise scintillators. The method may further include providing a second logging tool for measuring deviations in inner diameter of tubing 20 in wellbore 25. The second logging tool may comprise caliper tool 65 comprising caliper tool body 70 and two or more caliper arms 75 that extend outward from caliper tool body 70. The method may further include placing first logging tool 10 and second logging tool (e.g., caliper tool 65) into wellbore 25. First logging tool 10 may be placed into tubing 20 after second logging tool. The second logging tool may be coupled to first logging tool 10 to form connected unit 100. First logging tool 10 and the second logging tool may be connected on conveyance string 40. The method may further include logging the interior of tubing 20 with first logging tool 10 and the second logging tool to generate data. The method may further include generating a log of scale 60 location and type from the data. The step of generating the log may be performed real-time with the step of logging the interior of tubing 20. The step of generating the log may comprise determining whether an elemental yield is above a nominal value at a location in tubing 20 where the second logging tool identifies a deviation in the inner diameter of tubing 20. The step of generating the log may comprise identifying calcium carbonate scale if calcium yield is above a calcium threshold value and sulfur yield is not above a sulfur threshold value. The step of generating the log may comprise identifying calcium sulfate scale if calcium yield is above a calcium threshold value and sulfur yield is above a sulfur threshold value. The step of generating the log may comprise identifying iron sulfide scale if iron yield is above an iron threshold value and sulfur yield is above a sulfur threshold value. The step of generating the log may comprise identifying barium sulfate scale if barium yield is above a barium threshold value and sulfur yield is above a sulfur threshold value. The method may further comprise treating scale 60 in tubing 20 after the step of generating the log.

A method for scale identification and treatment may be provided. The method may be used in conjunction with one or more of the systems illustrated on FIGS. 1-3. The method may include collecting elemental data from first logging tool 10 about elemental makeup of a measured area surrounding first logging tool 10, wherein first logging tool 10 may be disposed in tubing 20 in wellbore 25. First logging tool 10 may comprise a pulsed neutron logging tool. First logging tool 10 may comprise tool body 15, neutron source 50 coupled to tool body 15, and detectors 55 coupled to tool body 15. Detectors 15 may comprise scintillators. The method may further comprise collecting tubing data about deviations in an inner diameter of tubing 20 from a second logging tool, wherein the second logging tool may be disposed in tubing 20 in wellbore 25. The second logging tool may comprise caliper tool 65 comprising caliper tool body 70 and two or more caliper arms 75 that extend outward from caliper tool body 70. First logging tool 10 may be placed into tubing 20 after second logging tool. The second logging tool may be coupled to first logging tool 10 to form connected unit 100. First logging tool 10 and the second logging tool may be connected on conveyance string 40. The method may further include identifying type and location of scale 60 in tubing 20 from elemental data and tubing data. The step of identifying type and location of the scale may comprise determining whether an elemental yield is above a nominal value at a location in tubing 20 where the second logging tool identifies a deviation in the inner diameter of tubing 20. The step of identifying type and location of the scale may comprise identifying calcium carbonate scale if calcium yield is above a calcium threshold value and sulfur yield is not above a sulfur threshold value. The step of identifying type and location of the scale may comprise identifying calcium sulfate scale if calcium yield is above a calcium threshold value and sulfur yield is above a sulfur threshold value. The step of identifying type and location of the scale may comprise identifying iron sulfide scale if iron yield is above an iron threshold value and sulfur yield is above a sulfur threshold value. The step of identifying type and location of the scale may comprise identifying barium sulfate scale if barium yield is above a barium threshold value and sulfur yield is above a sulfur threshold value. The method may further comprise treating scale 60 in tubing 20 after the step of generating the log. 14. The method may further include treating scale 60 in tubing 20 after the step of identifying the type and location of scale 60.

A system for scale identification may be provided. The system may include one or of the components illustrated on FIGS. 1-3. The system may comprise a first logging tool 10 comprising tool body 15, neutron source 50 coupled to the tool body 15, and detectors 55 coupled to the tool body 15. First logging tool 10 may comprise a pulsed neutron logging tool. Detectors 15 may comprise scintillators. The system may further comprise a second logging tool that determines deviations in an inner diameter of tubing 20. The second logging tool may comprise caliper tool 65 comprising caliper tool body 70 and two or more caliper arms 75 that extend outward from caliper tool body 70. The second logging tool may be coupled to first logging tool 10 to form connected unit 100. The system may further comprise computer system 45 that determines a log of scale type and location based at least in part on measurements received from first logging tool 10 and the second logging tool. Computer system 45 may further determine whether an elemental yield is above a nominal value at a location in tubing 20 where the second logging tool identifies a deviation in the inner diameter of tubing 20.

The preceding description provides various embodiments of the scale identifier system and methods of use which may contain different method steps and alternative combinations of components. It should be understood that, although individual embodiments may be discussed herein, the present disclosure covers all combinations of the disclosed embodiments, including, without limitation, the different component combinations, method step combinations, and properties of the system.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

Therefore, the present embodiments are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method for scale identification comprising:
disposing a first logging tool into a wellbore comprising a tool body, a neutron source coupled to the tool body, wherein the neutron source induces an emission of gamma rays from a measured area, wherein the emission of gamma rays is related to an elemental makeup of the measured area, and detectors coupled to the tool body;
disposing a second logging tool for measuring deviations in inner diameter of a tubing in the wellbore, wherein the second logging tool is coupled to the first logging tool;
logging the interior of the tubing with the first logging tool and the second logging tool to generate data;
analyzing the emission of gamma rays in relation to base element spectra; and
generating a log of scale location and type from the data.

2. A method according to claim 1 wherein the first logging tool is placed into the tubing after the second logging tool.

3. A method according to claim 1 wherein the first logging tool and the second logging tool are coupled to form a connected unit.

4. A method according to claim 1 wherein the step of generating the log is performed real-time with the step of logging the interior of the tubing.

5. A method according to claim 1 wherein the first logging tool comprises a pulsed neutron logging tool.

6. A method according to claim 1 wherein the second logging tool comprises a caliper tool comprising a caliper tool body and two or more caliper arms that extend outward from the caliper tool body.

7. A method according to claim 1 claim wherein the detectors comprise scintillators.

8. A method according to claim 1 wherein the step of generating the log comprises determining whether an elemental yield is above a nominal value at a location in the tubing where the second logging tool identifies a deviation in the inner diameter of the tubing.

9. A method according to claim 1 further comprising treating the scale in the tubing after the step of generating the log.

10. A method for scale identification comprising:
disposing a first logging tool into a wellbore comprising a tool body, a neutron source coupled to the tool body, wherein the neutron source induces an emission of gamma rays from a measured area, wherein the emission of gamma rays is related to an elemental makeup of the measured area, and detectors coupled to the tool body;

disposing a second logging tool for measuring deviations in inner diameter of a tubing in the wellbore, wherein the second logging tool is coupled to the first logging tool;

logging the interior of the tubing with the first logging tool and the second login tool to generate data;

analyzing the emission of gamma rays in relation to base element spectra; and generating a log of scale location and type from the data, wherein generating the log comprises of determining whether an elemental yield is above a nominal value at a location in the tubing where the second logging tool identifies a deviation in the inner diameter of the tubing, wherein determining whether an elemental yield is above a nominal value comprises at least one step selected from the group consisting of:

identifying calcium carbonate scale if calcium yield is above a calcium threshold value and sulfur yield is not above a sulfur threshold value;

identifying calcium sulfate scale if calcium yield is above a calcium threshold value and sulfur yield is above a sulfur threshold value;

identifying iron sulfide scale if iron yield is above an iron threshold value and sulfur yield is above a sulfur threshold value; and identifying barium sulfate scale if barium yield is above a barium threshold value and sulfur yield is above a sulfur threshold value.

11. A method for scale identification and treatment comprising:

collecting elemental data produced from a neutron source in a first logging tool, wherein the neutron source induces an emission of gamma rays from a measured area, wherein the emission of gamma rays is related to an elemental makeup of the measured area, wherein the first logging tool is disposed in tubing in a wellbore;

collecting tubing data about deviations in an inner diameter of the tubing from a second logging tool, wherein the second logging tool is coupled to the first logging tool;

analyzing the emission of gamma rays in relation to base element spectra;

identifying type and location of scale in the tubing from the elemental data and the tubing data; and treating the scale in the tubing after the step of identifying the type and location of the scale.

12. A method according to claim 11 wherein the first logging tool comprises a pulse neutron logging tool.

13. A method according to claim 11 wherein the second logging tool comprises a caliper tool comprising a caliper tool body and two or more caliper arms that extend outward from the caliper tool body.

14. A method according to claim 11 wherein the step of identifying type and location of the scale comprises determining whether an elemental yield is above a nominal value at a location in the tubing where the second logging tool identifies a deviation in the inner diameter of the tubing.

15. A method according to claim 14 wherein the step of identifying type and location of the scale comprises at least one step selected from the group consisting of:

identifying calcium carbonate scale if calcium yield is above a calcium threshold value and sulfur yield is not above a sulfur threshold value;

identifying calcium sulfate scale if calcium yield is above a calcium threshold value and sulfur yield is above a sulfur threshold value;

identifying iron sulfide scale if iron yield is above an iron threshold value and sulfur yield is above a sulfur threshold value; and identifying barium sulfate scale if barium yield is above a barium threshold value and sulfur yield is above a sulfur threshold value.

16. A system for scale identification comprising:

a first logging tool comprising a tool body, a neutron source coupled to the tool body, wherein the neutron source is operable to induce an emission of gamma rays from a measured area, wherein the emission of gamma rays is related to an elemental makeup of the measured area, and detectors coupled to the tool body;

a second logging tool coupled to the first logging tool that determines deviations in an inner diameter of a tubing; and a computer system that determines a log of scale type and location based at least in part on measurements received from the first logging tool and the second logging tool.

17. A system according to claim 16 wherein the first logging tool and the second logging tool are connected on a conveyance string.

18. A system according to claim 16 wherein the first logging tool comprises a pulse neutron logging tool.

19. A system according to claim 16 wherein the second logging tool comprises a caliper tool comprising a caliper tool body and two or more caliper arms that extend outward from the caliper tool body.

20. A system according claim 16 wherein the computer system determines whether an elemental yield is above a nominal value at a location in the tubing where the second logging tool identifies a deviation in the inner diameter of the tubing.

* * * * *